(12) United States Patent
Hoyte et al.

(10) Patent No.: US 7,762,153 B2
(45) Date of Patent: Jul. 27, 2010

(54) METHOD AND SYSTEMS FOR MEASURING BLADE DEFORMATION IN TURBINES

(75) Inventors: Scott Hoyte, Marietta, GA (US); Eric Gebhardt, Roswell, GA (US); Erin Bauknight, Seneca, SC (US); Samuel Draper, Simpsonville, SC (US); John Grant, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 129 days.

(21) Appl. No.: 11/809,054

(22) Filed: May 31, 2007

(65) Prior Publication Data

US 2008/0295604 A1 Dec. 4, 2008

(51) Int. Cl.
*G01M 15/14* (2006.01)
*G01M 1/22* (2006.01)
(52) U.S. Cl. .................... 73/865.9; 73/116.03
(58) Field of Classification Search ............... 374/120, 374/121; 73/865.9, 116.03
See application file for complete search history.

(56) References Cited

U.S. PATENT DOCUMENTS

| | | | | | |
|---|---|---|---|---|---|
| 3,678,493 | A | * | 7/1972 | Shuey | 340/529 |
| 4,518,917 | A | * | 5/1985 | Oates et al. | 324/207.25 |
| 4,876,505 | A | * | 10/1989 | Osborne | 324/207.25 |
| 4,955,269 | A | * | 9/1990 | Kendig et al. | 73/577 |
| 5,238,366 | A | * | 8/1993 | Ferleger | 416/61 |
| 5,502,650 | A | * | 3/1996 | Naruse et al. | 700/279 |
| 6,351,721 | B1 | * | 2/2002 | Werner et al. | 702/166 |
| 6,505,143 | B1 | * | 1/2003 | Lakshminarasimha et al. | 702/183 |
| 6,796,709 | B2 | * | 9/2004 | Choi | 374/102 |
| 7,243,048 | B2 | * | 7/2007 | Foslien et al. | 702/185 |
| 2007/0258807 | A1 | * | 11/2007 | Brummel | 415/118 |

OTHER PUBLICATIONS von Flotow, A.; Mercadal, M.; Tappert, P., "Health monitoring and prognostics of blades and disks with blade tip sensors," Aerospace Conference Proceedings, 2000 IEEE, vol. 6, pp. 433-440, 2000.*
Tappert, P.; von Flotow, A.; Mercadal, M., "Autonomous PHM with Blade-Tip Sensors: Algorithms and Seeded Fault Experience," Aerospace Conference, 2001, IEEE Proceedings, vol. 7, pp. 7-3295, 2001.*

* cited by examiner

*Primary Examiner*—Lisa M Caputo
*Assistant Examiner*—Punam Patel
(74) *Attorney, Agent, or Firm*—Mark E. Henderson; Ernest G. Cusick; Frank A. Landgraff

(57) ABSTRACT

A method for determining the radial deformation of a blade in a turbine that includes: 1) taking an initial measurement of the blade with one or more proximity sensors disposed around the circumference of a stage of blades; 2) after the initial measurement, taking a second measurement of the blade with the one or more proximity sensors; 3) making a determination of the radial deformation of the blade by comparing the initial measurement to the second measurement. The initial measurement and the second measurement may be taken while the turbine is operating.

8 Claims, 5 Drawing Sheets

METHOD AND SYSTEMS FOR MEASURING BLADE DEFORMATION IN TURBINES

TECHNICAL FIELD

This present application relates generally to methods and systems for determining turbine blade deformation. More specifically, but not by way of limitation, the present application relates to methods and systems for measuring turbine blade deformation while the turbine is operating.

BACKGROUND OF THE INVENTION

The turbine blades of industrial gas turbines and aircraft engines operate in a high temperature environment, where the temperatures regularly reach between 600° C. and 1500° C. Moreover, the general trend is to increase the turbine operating temperatures to increase output and engine efficiencies. Thermal stresses placed on the turbine blades associated with these conditions are severe.

In general, turbine blades undergo high level of mechanical stress due to the forces applied via the rotational speed of the turbine. These stresses have been driven to even higher levels in an effort to accommodate turbine blade design that include higher annulus areas that yield higher output torque during operation. In addition, the desire to design turbine blade tip shrouds of greater surface area has added addition weight to the end of the turbine blade, which has further increased the mechanical stresses applied to the blades during operation. When these mechanical stresses are coupled with the severe thermal stresses, the result is that turbine blades operate at or close to the design limits of the material. Under such conditions, turbine blades generally undergo a slow deformation, which is often referred to as "metal creep." Metal creep refers to a condition wherein a metal part slowly changes shape from prolonged exposure to stress and high temperatures. Turbine blades may deform in the radial or axial direction.

Similarly, compressor blades undergo a high level of mechanical stress due to the forces applied via the rotational speed of the compressor. As a result compressor blades also may undergo the slow deformation associated with metal creep.

As a result, the turbine blade and compressor blade failure mode of primary concern in a turbine is metal creep, and particularly radial metal creep (i.e., elongation of the turbine or compressor blade). If left unattended, metal creep eventual may cause the turbine or compressor blade to rupture, which may cause extreme damage to the turbine unit and lead to significant repair downtime. In general, conventional methods for monitoring metal creep include either: (1) attempting to predict the accumulated creep elongation of the blades as a function of time through the use of analytical tools such as finite element analysis programs, which calculate the creep strain from algorithms based on creep strain tests conducted in a laboratory on isothermal creep test bars; or (2) visual inspections and/or hand measurements conducted during the downtime of the unit. However, the predictive analytical tools often are inaccurate. And, the visual inspections and/or hand measurements are labor intensive, costly, and, often, also yield inaccurate results.

In any case, inaccurate predictions as to the health of the turbine or compressor blade, whether made by using analytical tools, visual inspection or hand measurements, may be costly. On the one hand, inaccurate predictions may allow the blades to operate beyond their useful operating life and lead to a blade failure, which may cause severe damage to the turbine unit and repair downtime. On the other hand, inaccurate predictions may decommission a turbine or compressor blade to early (i.e., before its useful operating life is complete), which results in inefficiency. Accordingly, the ability to accurately monitor the metal creep deformation of turbine and/or compressor blades may increase the overall efficiency of the turbine engine unit. Such monitoring may maximize the service life of the blades while avoiding the risk of blade failure. In addition, if such monitoring could be done without the expense of time-consuming and labor-intensive visual inspections or hand measurements, further efficiencies would be realized. Thus, there is a need for improved systems for monitoring or measuring the metal creep deformation of turbine and compressor blades.

BRIEF DESCRIPTION OF THE INVENTION

The present application thus describes a method for determining the radial deformation of a blade in a turbine that includes: 1) taking an initial measurement of the blade with one or more proximity sensors disposed around the circumference of a stage of blades; 2) after the initial measurement, taking a second measurement of the blade with the one or more proximity sensors; 3) making a determination of the radial deformation of the blade by comparing the initial measurement to the second measurement. The initial measurement and second measurement each may indicate the distance from a tip of the blade to the one or more proximity sensors. The initial measurement and the second measurement may be taken while the turbine is operating.

In some embodiments, the method may further include the step of sending an alert to a turbine operator when a predetermined level of radial deformation has been determined. In other embodiments, the method may further include the steps of: 1) measuring a radial temperature profile of the blade; and 2) determining, from the radial temperature profile, the extent to which the radial deformation is uniform or concentrated.

In some embodiments, the number of proximity sensors may be two or more, and the method may further include the steps of: 1) determining a rotor displacement from the measurements taken by the two or more proximity sensors; and 2) accounting for the rotor displacement when making the determination of the radial deformation of the blade. In other embodiments, the number of proximity sensors may be one, and the method may further include the steps of: 1) measuring a rotor displacement with the one or more rotor probes; and 2) accounting for the rotor displacement when making the determination of the radial deformation of the blade.

The present application may further describe a system for determining the radial deformation of a blade in a turbine that includes: 1) one or more proximity sensors disposed around the circumference of a stage of blades; and 2) a control system that receives measurement data from the proximity sensors. The control system may be configured to determine a radial deformation of the blade by comparing an initial measurement to a second measurement of the blade that are taken by the one or more proximity sensors. The initial measurement and second measurement each may indicate the distance from a tip of the blade to the one or more proximity sensors. The initial measurement and the second measurement may be taken while the turbine is operating.

In some embodiments, the system may include an infrared pyrometer. In such embodiments, the infrared pyrometer may measure the radial temperature profile of the blade and provide the radial temperature profile data to the control system. The control system then may determine, from the radial temperature profile data, the extent to which the radial deformation is uniform or concentrated. In some embodiments, the control system may be configured to generate and send an alert to a turbine operator when a predetermined level of radial deformation has been determined.

In some embodiments, the number of proximity sensors may be two or more. In such embodiments, the control system may determine a rotor displacement from the measurements taken by the two or more proximity sensors. The control system further may account for the rotor displacement when making the determination of the radial deformation of the blade.

In other embodiments, the number of proximity sensors may be one. In such embodiments, the control system may measure a rotor displacement with one or more rotor probes. The control system further may account for the rotor displacement when making the determination of the radial deformation of the blade.

The present application may further describe a method for determining the axial deformation of a blade in a turbine that includes: 1) taking an initial measurement of a distance from fixed locations on a turbine casing to the blade with one or more proximity sensors disposed around the circumference of a stage of blades, the fixed locations being one of upstream from the axial location of the stage of blades, downstream from the axial location of the stage of blades, and both upstream and downstream from the axial location of the stage of blades; 2) after the initial measurement, taking a second measurement of the distance with the one or more proximity sensors; and 3) making a determination of the axial deformation of the blade by comparing the initial measurement to the second measurement. The initial measurement and the second measurement each may indicate the distance from a side of the blade to the one or more proximity sensors. The initial measurement and the second measurement may be taken while the turbine is operating.

In some embodiments, the method may further include the steps of: 1) measuring a radial temperature profile of the blade; and 2) determining, from the radial temperature profile, the extent to which the axial deformation is uniform or concentrated.

The present application further describes a system for determining the axial deformation of a blade in a turbine that includes: 1) one or more proximity sensors disposed at fixed locations around the circumference of a stage of blades, said fixed locations being one of upstream from the axial location of the stage of blades, downstream from the axial location of the stage of blades, and both upstream and downstream from the axial location of the stage of blades; and 2) a control system that receives measurement data from the proximity sensors. The control system may be configured to determine an axial deformation of the blade by comparing an initial measurement to a second measurement of the blade that are taken by the one or more proximity sensors. The initial measurement and second measurement each may indicate the distance from a side of the blade to the one or more proximity sensors. The initial measurement and the second measurement may be taken while the turbine is operating.

In some embodiments, the system may further include an infrared pyrometer. The infrared pyrometer may measure the radial temperature profile of the blade and provides the radial temperature profile data to the control system. The control system then may determine, from the radial temperature profile data, the extent to which the axial deformation is uniform or concentrated.

These and other features of the present application will become apparent upon review of the following detailed description of the preferred embodiments when taken in conjunction with the drawings and the appended claims.

DETAILED DESCRIPTION OF THE INVENTION

Figure 1:
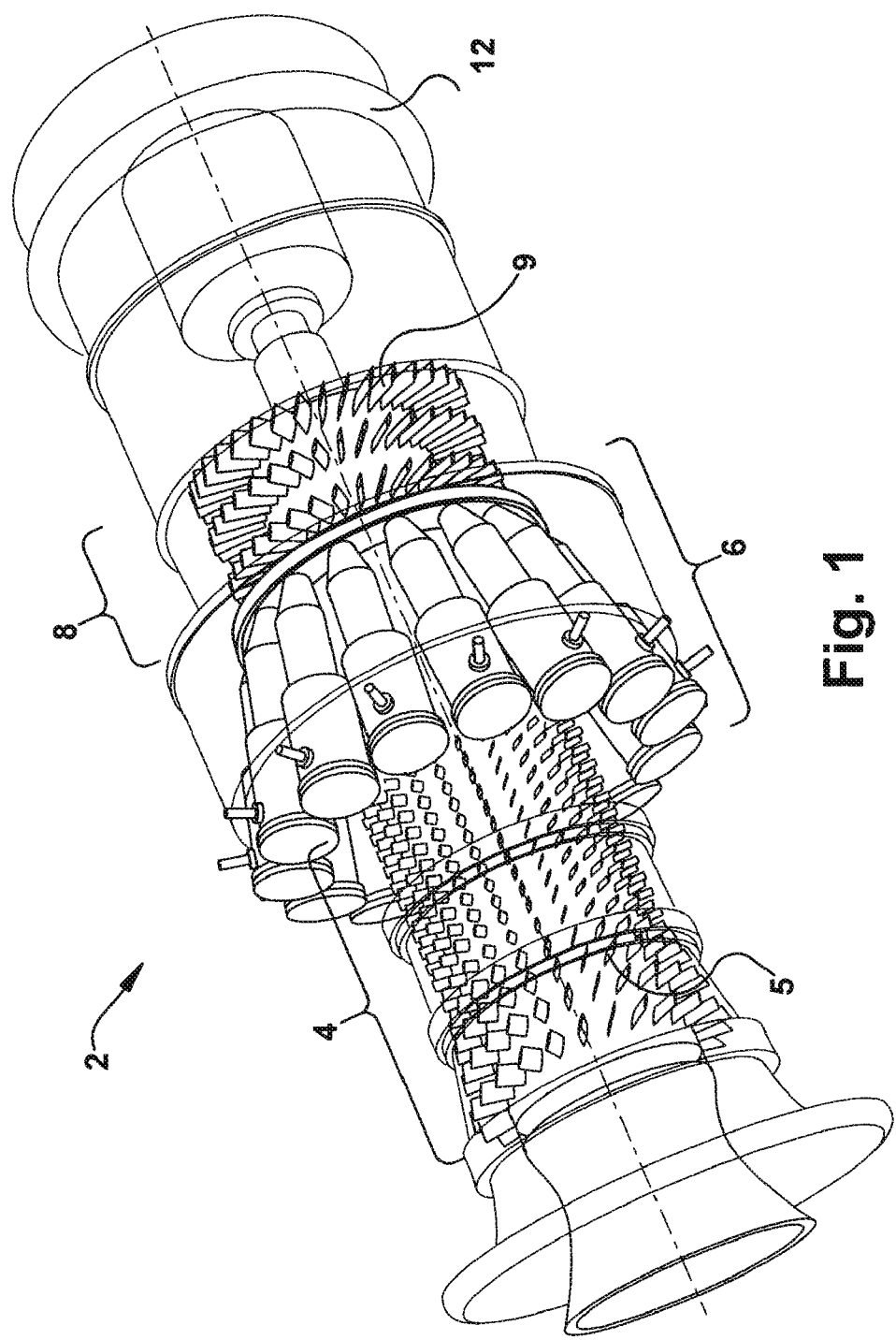
FIG. 1 is a perspective cut-away view of a gas turbine demonstrating an exemplary turbine in which an embodiment of the present invention may be used.
Figure 2:
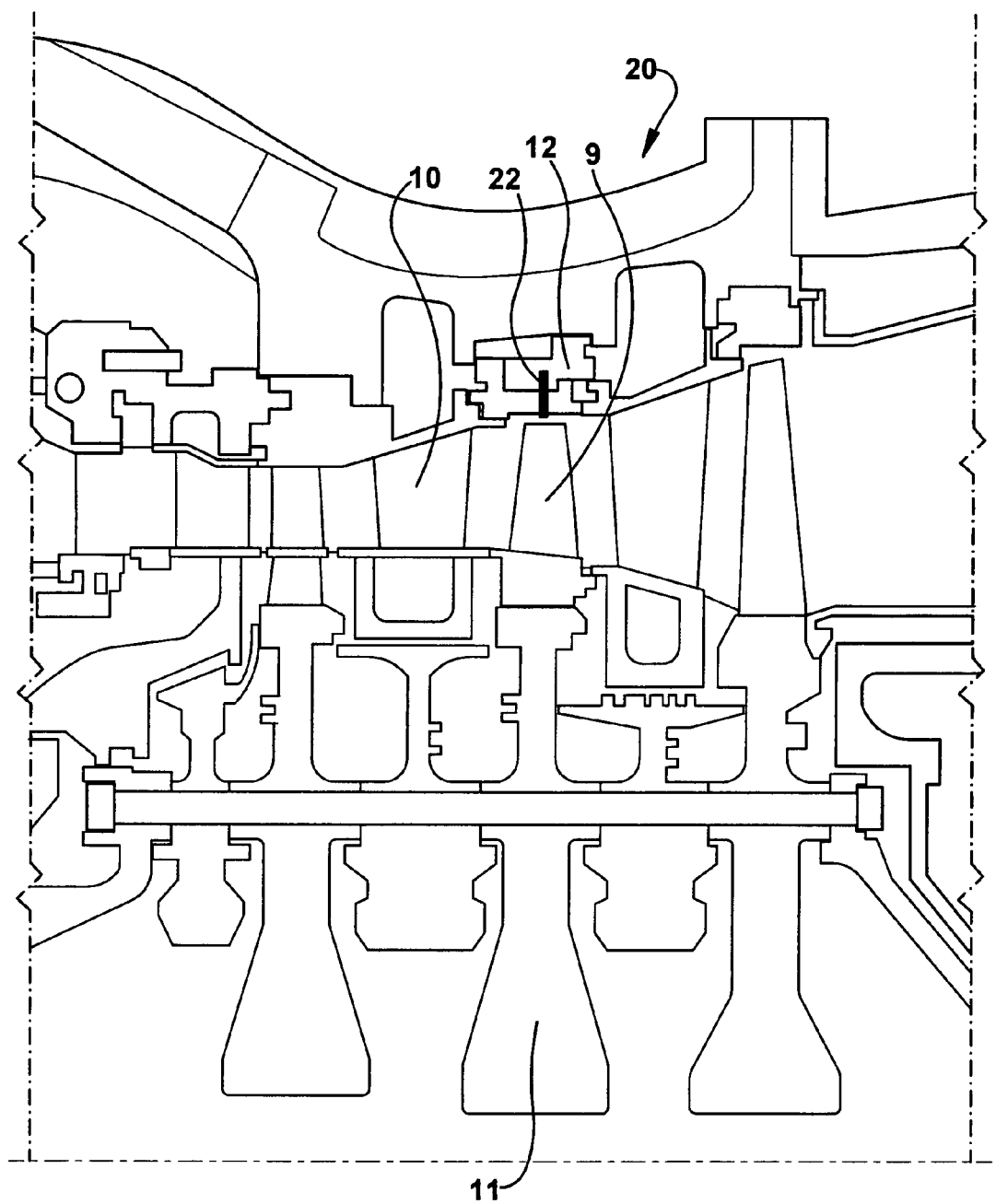
FIG. 2 is a cross-sectional view of the gas turbine of FIG. 1 demonstrating an exemplary embodiment of the present invention.

A technique has been developed to measure accurately, reliable, and at a relatively low cost the deformation of turbine blades in real time, i.e., as the gas turbine is operating. Referring now to FIG. 1, a typical gas turbine 2 is illustrated in which exemplary embodiments of the present invention may be used. While FIG. 1 depicts a gas turbine, it is understood that the present invention also may be used in steam turbines also. As shown, the gas turbine 2 may include a compressor 4, which may include several stages of compressor blades 5, that compresses a working fluid, i.e., air. The gas turbine 2 may include a combustor 6 that combusts a fuel with the compressed air. The gas turbine 2 further may include a turbine 8 that includes several stages of airfoils or turbine blades 9, which convert the energy from the expanding hot gases into rotational mechanical energy. As used herein, the term "blades" will be used to refer to either compressor blades or turbine blades. The turbine 8 also may include diaphragms 10, as shown in FIG. 2, which are stationary components that direct the flow of hot gases onto the turbine blades 9. The gas turbine 2 may include a rotor 11 onto which the compressor blades 5 and turbine blades 9 are mounted. A turbine casing 12 may enclose the gas turbine 2.

As illustrated in FIG. 2, a blade radial deformation monitoring system 20 in accordance with the present invention may include one or more proximity sensors 22 that are spaced around the circumference of a single stage of compressor blades 5 or turbine blades 9. Specifically, the proximity sensors 22 may be mounted in the turbine casing 10 such that the proximity sensors 22 face a stage of compressor blades 5 or, as shown, a stage of turbine blades 9 from an outwardly radial position. In this manner, the proximity sensors 22 may measure the distance from the proximity sensor 22 to the tip of the compressor blade 5 or turbine blade 9, whatever the case may be. In some embodiments, the proximity sensor 22 may be a eddy current sensor, capacitive sensor, microwave sensor, laser sensor, or another similar type of device.

Through conventional means the sensors may be connected to a control system (not shown), which may receive, store and make calculations based on the proximity data acquired by the proximity sensors 22. The control system may comprise any appropriate high-powered solid-state switching device. The control system may be a computer; however, this is merely exemplary of an appropriate high-powered control system, which is within the scope of the application. For example, but not by way of limitation, the control system may include at least one of a silicon controlled rectifier (SCR), a thyristor, MOS-controlled thyristor (MCT) and an insulated gate bipolar transistor. The control system also may be implemented as a single special purpose integrated circuit, such as ASIC, having a main or central processor section for overall, system-level control, and separate sections dedicated performing various different specific combinations, functions and other processes under control of the central processor section. It will be appreciated by those skilled in the art that the control system also may be implemented using a variety of separate dedicated or programmable integrated or other electronic circuits or devices, such as hardwired electronic or logic circuits including discrete element circuits or programmable logic devices, such as PLDs, PALs, PLAs or the like. The control system also may be implemented using a suitably programmed general-purpose computer, such as a microprocessor or microcontrol, or other processor device, such as a CPU or MPU, either alone or in conjunction with one or more peripheral data and signal processing devices.

In use, the blade radial deformation monitoring system 20 may operate as follows. While this example of operation will relate to measuring the deformation of turbine blades 9, those of ordinary skill will recognize that the same general operation methodology may be applied to compressor blades 5. The proximity sensors 22 may take an initial measurement of each of the turbine blades 9 during the startup of the gas turbine 2. As one of ordinary skill in the art will appreciate, surface differences of each of the blades may identify each particular blade to the control system by the profile measured by the proximity sensors 22. Specifically, the minute surface differences of each of the blades may allow the control system to identify the individual blade and, thus, track the deformation of each individual blade. The initial measurement may indicate the initial length of each of the turbine blades 9. This may be determined by the known size and position of the rotor 11 and the distance measured from the proximity sensor 22 to the tip of each of the turbine bladed 9. That is, from these two values the length of the turbine blade 9 may be calculated. The initial measurement data may be stored by the control system.

As the gas turbine 2 operates, a later or second measurement may be taken. These measurements may be taken periodically, for example, they may be taken every second or every minute or every hour or some longer period. The second measurement may indicate the length of each of the turbine blades 9 at the time of the measurement. Again, this length may be determined by the known size and position of the rotor and the distance measured from the proximity sensor 22 to the tip of the turbine blade 9. From these two values the length of the turbine blade 9 may be calculated. The second measurement data may be stored by the control system.

The control system may process the measurement data to determine if the turbine blade 9 has deformed in the radial direction, i.e., whether the turbine blade has "stretched" during use. Specifically, the control system may compare the second measurement to the initial measurement to ascertain the amount of deformation or creep that has occurred. The control system may be programmed to alert a turbine operator once the deformation reaches a certain level. For example, the control system may provide a flashing alert to a certain computer terminal, send an email or a page to a turbine operator or use some other method to alert the turbine operator. This alert may be sent when the level of deformation indicates that the turbine blade 9 is nearing or is at the end of its useful life. At this point, the turbine blades 9 may be pulled from the gas turbine 2 and repaired or replaced.

Figure 3:
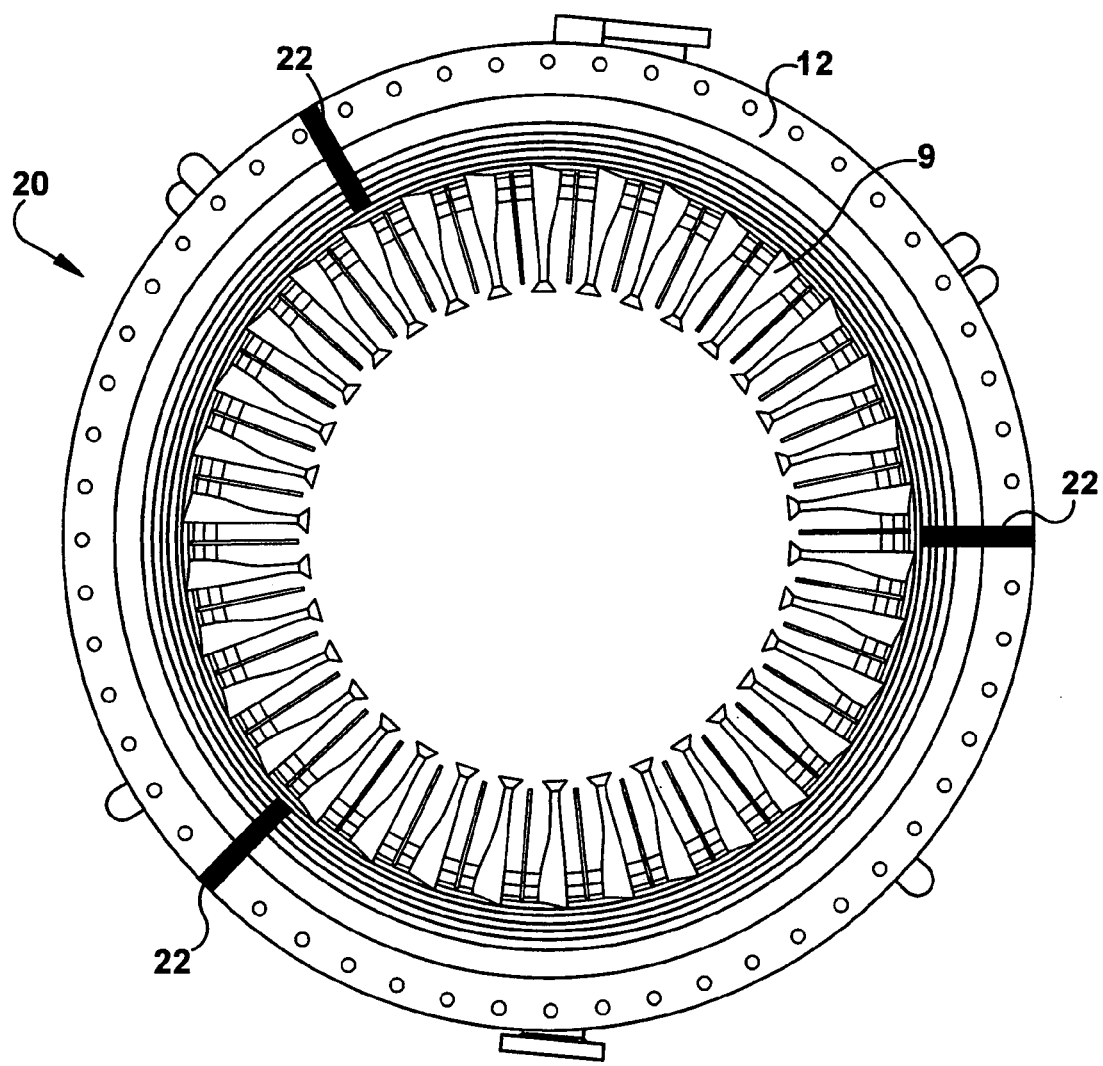
FIG. 3 is a cross-sectional view of the gas turbine of FIG. 1 demonstrating the circumferential placement of the proximity sensors according to an exemplary embodiment of the present invention.

As stated, the blade radial deformation monitoring system 20 may include one or more proximity sensors 22. As illustrated in FIG. 3, the blade radial deformation monitoring system 20 may include three proximity sensors 22 evenly spaced around the circumference of the blades; though, those of ordinary skill in the art will recognize that more or less proximity sensors 20 may be used. The advantage of having multiple sensors is that the relative position of the rotor 11 in the casing 12 may be determined and accounted for in calculating the actual deformation or creep of the blades. Those of ordinary skill in the art will appreciate that changes in the relative position of the rotor with respect to the turbine casing 12 occur due to rotor sag, bearing movement, turbine casing out-of-round and other issues. This displacement may be taken for blade deformation if is not accounted for by the several proximity sensors 22. Thus, the displacement of the blades that may be attributed to rotor movement may be accounted for such that actual blade deformation is determined. For example, in the case of three sensors as shown in FIG. 3, measurement data may indicate that for one of the proximity sensors 22 one of the blades has stretched and for the other two proximity sensors 22 the blade has shrunk. These results indicate that the rotor has displaced inside the casing toward the proximity sensor 22 that shows the stretching. Per conventional methods, the control system may use an algorithm to determine the rotor displacement given the three measurements. Then, the control system may eliminate the rotor displacement to determine the actual radial deformation of each of the blades.

As stated, in some embodiments, only one proximity sensor 22 may be used. In such a system, it may be advantageous to used conventional rotor probes, such as a Bently probe, to determine rotor position. The rotor probes may be positioned at any point on the rotor and may measure the actual radial position of the rotor in real time. As stated, it will be understood by those skilled in the art that the rotor may displace radially during operation. This displacement may appear as deformation of the blades if the actual rotor positioning is not taken into account. If, on the other hand, the actual rotor displacement is calculated by the rotor probes, the control system may calculate the actual deformation of the blades.

Figure 4:
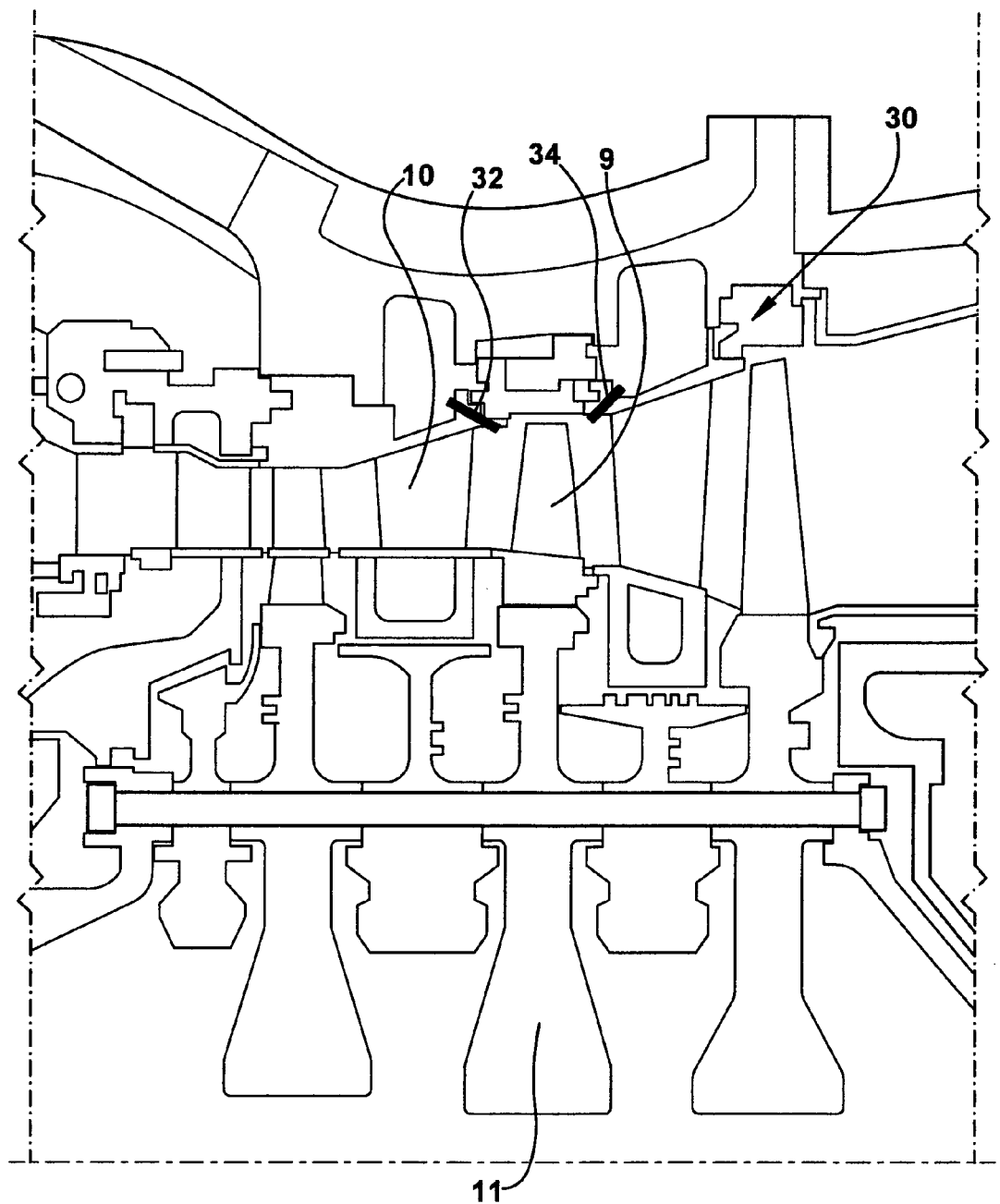
FIG. 4 is a cross-sectional view of the gas turbine of FIG. 1 demonstrating an exemplary embodiment of the present invention.

In some embodiments, the proximity sensors 22 may be located such that they measure axial deformation. As illustrated in FIG. 4, this may be accomplished by placing the proximity sensors 22 in a position such that they are observing the blades from a position that is upstream or in front of the axial position of the blade or from a position that is downstream or behind the axial position of the blade (i.e., the proximity sensors do not look down on the stage, but from an angled position). Thus, a blade axial deformation monitoring system 30 may include an upstream proximity sensor 32, a downstream proximity sensor 34, or both at one or more locations around the circumference of the stage. The upstream proximity sensor 32 may measure the distance from a fixed upstream location in the turbine casing 12 to the side of the blade. Likewise, the downstream proximity sensor 34 may measure the distance from a fixed downstream location in the turbine casing 12 to the side of the blade. Thus, any axial deformation in the upstream or downstream direction of the blade may be determined by, examining the successive measurements taken by the upstream proximity sensor 32, the downstream proximity sensor 34, or both.

Similar to the blade radial deformation monitoring system 20, it may be advantageous for the blade axial deformation monitoring system 30 to have multiple proximity sensors 22 spaced about the circumference of the stage. The advantage of having multiple sensors is that the relative position of the rotor may be determined and accounted for in determining the actual axial creep of the blades.

Figure 5:
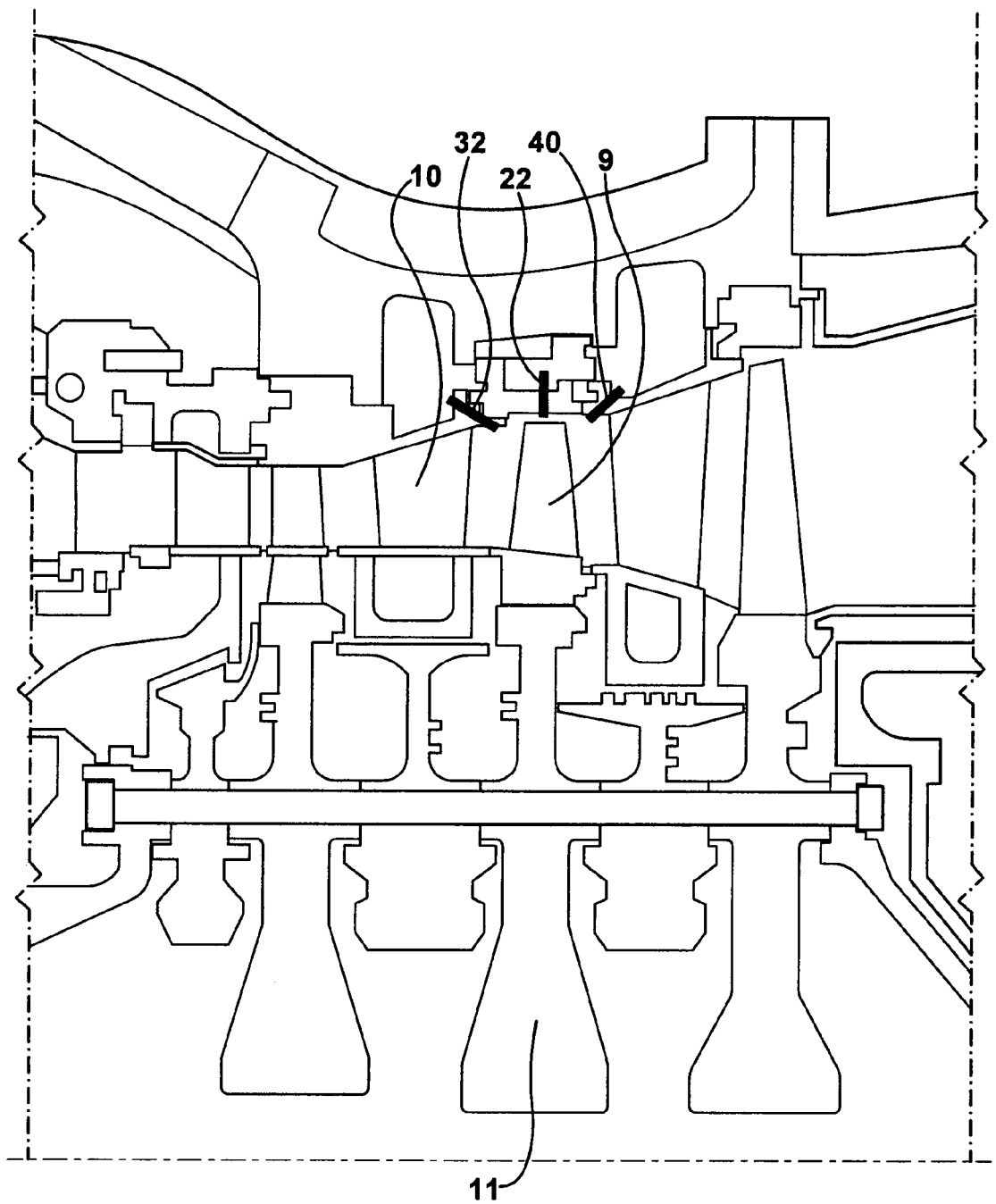
FIG. 5 is a cross-sectional view of the gas turbine of FIG. 1 demonstrating an exemplary embodiment of the present invention.

As illustrated in FIG. 5, in some embodiments, the blade radial deformation monitoring system 20 and/or the blade axial deformation monitoring system 30 may be augmented with conventional infrared pyrometers 40 that provide a radial temperature profile of each of the blades. The infrared pyrometers used in such embodiments may be any conventional infrared pyrometer or similar devices. In use, the infrared pyrometers 40 may measure the radial temperature profile of each of the blades during operation. The control system may track the radial creep as measured by the proximity sensors 22 and/or the axial creep as measured by an upstream proximity sensor 32, and the radial temperature profile for each of the blades. The radial temperature profile will allow the control system to determine if any of the blades developed a "hot spot" (i.e., an area of increased temperature) during operation. With this information, the control system may determine if a greater percentage of either the measured axial or radial creep may be attributed to the area of the blade that coincides with the hot spot, as areas of increased temperature undergo deformation or creep at a faster rate. As one of ordinary skill in the art will appreciate, whether the creep is uniform throughout the blade or concentrated affects the anticipated life of the part. Thus, if it is determined that, because of a measured hot spot, the blade likely underwent concentrated creep or deformation, the anticipated life of the part will be decreased. If, on the other hand, it is determined that, because of the absence of any hot spots, the blade likely underwent uniform creep, the anticipated life of the part will not be decreased. In this manner, failure due to concentrated creep may be avoided.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A method for determining the axial deformation of a blade in a turbine, the method comprising the steps of:
    taking an initial measurement of a distance from fixed locations on a turbine casing to the blade with one or more proximity sensors disposed around the circumference of a stage of blades, said fixed locations being one of upstream from the axial location of the stage of blades, downstream from the axial location of the stage of blades, and both upstream and downstream from the axial location of the stage of blades;
    after the initial measurement, taking a second measurement of the distance with the one or more proximity sensors; and
    making a determination of the axial deformation of the blade by comparing the initial measurement to the second measurement.

2. The method of claim 1, wherein the initial measurement and the second measurement each indicate the distance from a side of the blade to the one or more proximity sensors.

3. The method of claim 1, wherein the initial measurement and the second measurement are taken while the turbine is operating.

4. The method of claim 1, further comprising the steps of:
    measuring a radial temperature profile of the blade; and
    determining, from the radial temperature profile, the extent to which the axial deformation is uniform or concentrated.

5. A system for determining the axial deformation of a blade in a turbine, the system comprising:
    one or more proximity sensors disposed at fixed locations around the circumference of a stage of blades, said fixed locations being one of upstream from the axial location of the stage of blades, downstream from the axial location of the stage of blades, and both upstream and downstream from the axial location of the stage of blades; and
    a control system that receives measurement data from the proximity sensors;
    wherein the control system is configured to determine an axial deformation of the blade by comparing an initial measurement to a second measurement of the blade that are taken by the one or more proximity sensors.

6. A system of claim 5, wherein the initial measurement and second measurement each indicate the distance from a side of the blade to the one or more proximity sensors.

7. The system of claim 5, wherein the initial measurement and the second measurement are taken while the turbine is operating.

8. The system of claim 5, further comprising an infrared pyrometer;
    wherein the infrared pyrometer measures the radial temperature profile of the blade and provides the radial temperature profile data to the control system; and
    wherein the control system determines, from the radial temperature profile data, the extent to which the axial deformation is uniform or concentrated.

* * * * *